United States Patent

Stallinga et al.

(10) Patent No.: US 6,496,452 B2
(45) Date of Patent: Dec. 17, 2002

(54) OPTICAL SCANNING WITH ABERRATION CORRECTION

(75) Inventors: Sjoerd Stallinga, Eindhoven (NL); Joris Jan Vrehen, Eindhoven (NL); Jeroen Wals, Eindhoven (NL)

(73) Assignee: Koninklijke Philips Electroncis N.V., Eindhoven (NL)

( * ) Notice: Subject to any disclaimer, the term of this patent is extended or adjusted under 35 U.S.C. 154(b) by 25 days.

(21) Appl. No.: 09/741,920

(22) Filed: Dec. 20, 2000

(65) Prior Publication Data
US 2001/0009538 A1 Jul. 26, 2001

(30) Foreign Application Priority Data
Dec. 24, 1999 (EP) .............................. 99204552

(51) Int. Cl.[7] .................................................. G11B 7/00
(52) U.S. Cl. ............................. 369/44.23; 369/44.32; 369/112.01
(58) Field of Search ........................... 369/44.11, 44.12, 369/44.23, 44.24, 44.28, 44.32, 53.1, 53.12, 53.14, 53.19, 112.01, 112.02, 94

(56) References Cited

U.S. PATENT DOCUMENTS 5,615,186 A * 3/1997 Rosen et al. ............. 369/44.24
6,002,661 A * 12/1999 Abe et al. ............ 369/44.23 X
6,094,410 A * 7/2000 Fan et al. ..................... 369/94
6,125,088 A * 9/2000 Ogasawara .............. 369/44.32

FOREIGN PATENT DOCUMENTS

EP 0745980 A1 12/1996 ............ G11B/7/09

* cited by examiner

Primary Examiner—Muhammad Edun
(74) Attorney, Agent, or Firm—Michael E. Belk

(57) ABSTRACT

An optical head scans the information layer (3) of an optical record carrier (1) by means of a radiation beam (13). Optical aberrations in the beam such as coma and spherical aberration, caused by tilt and thickness variations in the optical disc respectively, are compensated by an aberration compensator (27) arranged in the radiation beam. The tilt or thickness variation is measured by a detector (30) and used to control the aberration compensator. The radiation beam is focused onto the information layer by an objective system (11). A displacement of the objective system in the transverse direction (26) as used for radial tracking of the optical beam, causes a mismatch between the wavefront to be compensated and the wavefront introduced by the aberration compensator (27). The detrimental effects of the mismatch are reduced by compensating only part of the aberration. The degree of compensation depends on the maximum displacement of the objective system and the tolerable wavefront error.

19 Claims, 4 Drawing Sheets

OPTICAL SCANNING WITH ABERRATION CORRECTION

BACKGROUND OF THE INVENTION

1. Technical Field

The invention relates to an optical head for scanning an optical record carrier having an information layer, comprising a radiation source for generating a radiation beam and an objective system for converging the radiation beam to a focus on the information layer, an actuator for displacing the objective system over a range in a direction transverse to its optical axis, an aberration detector for detecting an amount of an optical aberration in the radiation beam, an aberration compensator arranged in the optical path between the radiation source and the objective system, and a control circuit connected to an output of the aberration detector for controlling the aberration compensator. The invention also relates to a device for scanning an optical record carrier having an information layer and a transparent layer.

The information stored in an optical record carrier is arranged in tracks in the information layer of the record carrier. The information is written, read or erased by means of a focussed radiation beam that follows the track. The position of the focus is kept in the plane of the information layer by means of a focus servo that controls the axial position of the objective lens used for focussing the radiation beam. A second servo system controls the transverse position of the focus in order to keep the focus on the track being scanned. The transverse direction is the direction in the plane of the information layer perpendicular to the direction of the track. The second servo system causes the objective lens to move in the transverse direction, i.e. in a direction perpendicular to its optical axis, thereby moving the focus also in the transverse direction. On a disk-shaped record carrier the transverse direction corresponds to the radial direction; therefore the second servo system is also called the radial tracking servo.

2. Related Art

The trend of increasing information density on optical record carriers requires a commensurate decrease in the size of the focus of the radiation beam formed on the information layer. A smaller focus can be realized by increasing the numerical aperture of the radiation beam incident on the record carrier. However, an increase of the numerical aperture increases the susceptibility of the optical system in the head to optical aberrations. One of the aberrations is coma, caused by the transparent layer of the record carrier when it is not perpendicular to the principal ray of the radiation beam incident on the record carrier. Such non-perpendicular incidence of the radiation beam on the record carrier, generally referred to as tilt, may be caused by warping of the record carrier. Optical heads having a high numerical aperture require compensation of the coma caused by the tilt in order to scan the information layer of the record carrier properly.

European Patent Application No. 0 745 980 shows an optical head provided with a tilt compensator. The tilt compensator is an electrostriction device arranged in the optical path between the radiation source and the objective system. The known head is also provided with a tilt detector for detecting tilt of the record carrier. The output signal of the tilt detector is used to control the tilt compensator, which introduces a wave front aberration in the radiation beam that compensates the coma caused by the tilted record carrier. It is a disadvantage of the known device, that the aberration compensation does not operate properly when the optical head is following a track.

It is an object of the invention to provide an optical head that has a good aberration compensation independent of the tracking of the focus.

SUMMARY OF THE INVENTION

This object is achieved if, according to the invention, the control circuit is arranged such that the aberration compensator compensates the optical aberration to a degree less than the measured amount for substantially all displacements in the range. The invention is based on the insight that the aberration introduced by the aberration compensator causes other aberrations in the radiation beam when the objective system is displaced in the transverse direction with respect to the aberration compensator. The magnitude of the other aberrations depends both on the amount of the aberration introduced by the aberration compensator and on the displacement of the objective system. At increasing displacement the wavefront error of the other aberrations might become larger than the aberration to be compensated. In such a case the compensation of the aberration increases the wavefront error instead of decreasing it. The invention solves this problem by compensating only a part of the optical aberration instead of the entire measured amount of the aberration, as is customary in the known scanning devices. As a result, a small wavefront error will remain because of the uncompensated amount of the optical aberration to be compensated and a wavefront error due to the other aberrations caused by the displacement of the objective system, the latter wavefront error being smaller than in the known optical head because of the incomplete compensation. A compensation is called "partial" if the compensation removes 90% or less of the RMS wavefront error to be compensated.

There are several ways to determine the degree of compensation. In a first preferred embodiment, the optical head is provided with an actuator for displacing the objective system in a direction transverse to its optical axis and the degree of compensation depends on a maximum value of the displacement of the objective system, the degree being independent of the instantaneous displacement. The total wavefront error now comprises two components: the first component due to the uncompensated aberration, which has a constant value independent of the displacement of the objective system, and a wavefront error due to the other aberrations, being zero for a centred objective system and reaching a maximum value when the objective system is at a maximum displacement. The degree of compensation must be chosen such that the wavefront error both with centred objective system and with objective system at maximum displacement are acceptable for the performance of the optical head. It is an advantage of this embodiment that the control of the aberration compensator can be relatively simple, in that the control circuit need have an input from the aberration detector only.

In a second preferred embodiment, the optical head comprises a position detector for determining a transverse position of the objective system, the control circuit being connected to an output of the position detector and to an output of the aberration detector, and the degree of compensation depends on the instantaneous displacement of the objective system. By using the position of the objective system, the degree of compensation can be optimized in dependence on the instantaneous displacement of the objective system, thereby further reducing the total wavefront error. In particular, the wavefront error for the centred objective system can be made substantially equal to zero.

In a preferred embodiment of the optical head, the aberration compensator reduces coma in the radiation beam, which may be caused by tilt of the record carrier. The aberration detector may be a tilt detector for measuring the tilt of the record carrier.

In another preferred embodiment of the optical head, the aberration compensator reduces spherical aberration in the radiation beam. The spherical aberration may be caused by thickness variations of a transparent layer on the record carrier through which the radiation beam is focused onto the information layer.

A further aspect of the invention relates to a device for scanning an optical record carrier having an information layer, comprising an optical head according to the invention, and an information processing using for error correction.

BRIEF DESCRIPTION OF THE DRAWINGS

The objects, advantages and features of the invention will be apparent from the following more particular description of preferred embodiments of the invention, as illustrated in the accompanying drawings, in which.

DETAILED DESCRIPTION OF THE INVENTION

Figure 1:
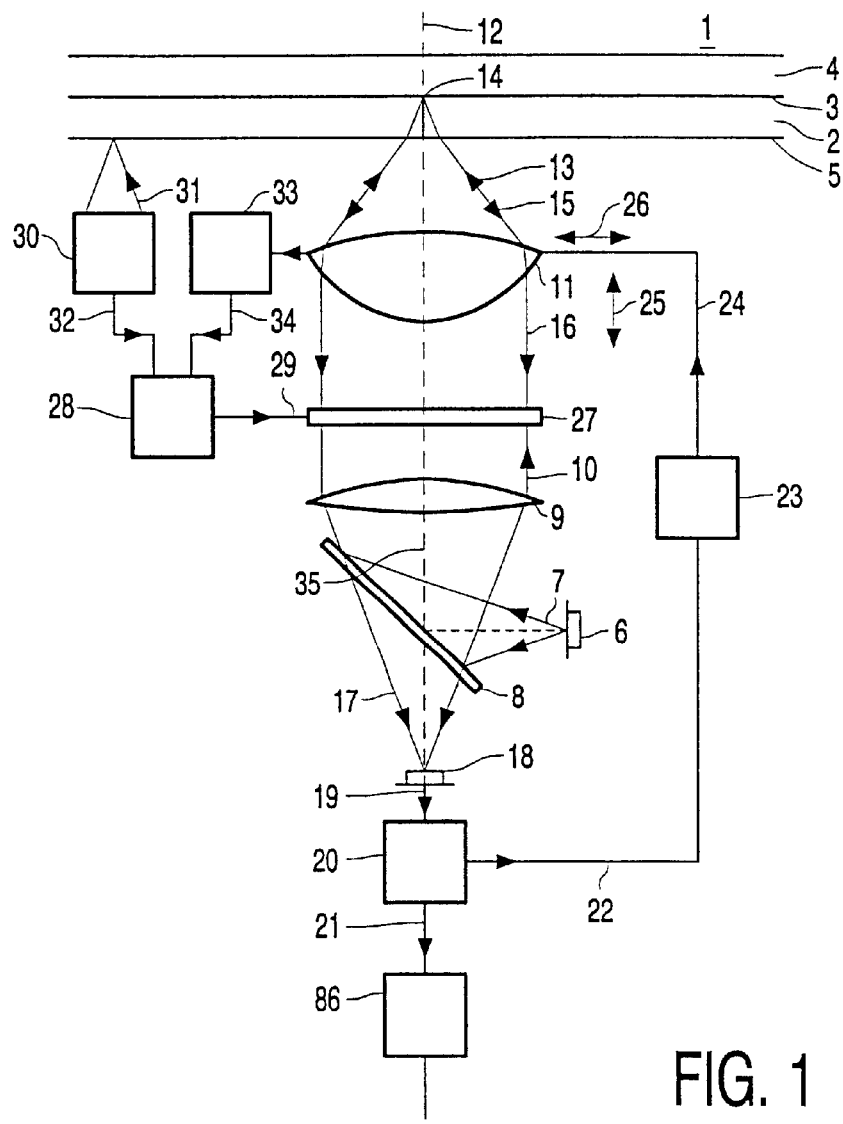
FIG. 1 shows a scanning device according to the invention.

FIG. 1 shows a device for scanning an optical record carrier 1. The record carrier comprises a transparent layer 2, on 1 side of which information layer 3 is arranged. The side of the information layer facing away from the transparent layer is protected from environmental influences by a protection layer 4. The side of the transparent layer facing the device is called the entrance face 5. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further information layer and a transparent layer connected to the information layer 3. Information may be stored in the information layer 3 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device comprises a radiation source 6, for example a semiconductor laser, emitting a diverging radiation beam 7. A beam splitter 8, for example a semitransparent plate, reflects the radiation beam towards a collimator lens 9, which converts the diverging beam 7 into a collimated beam 10. The collimated beam 10 is incident on objective system 11. The objective system may comprise one or more lenses and/or a grating. The objective system 11 has an optical axis 12. The objective system 11 changes the collimated beam 10 to a converging beam 13, incident on the entrance face 5 of the record carrier 1. The converging beam 13 forms a spot 14 on the information layer 3. Radiation reflected by the information layer 3 forms a diverging beam 15, transformed into a collimated beam 16 by the objective system 11 and subsequently into a converging beam 17 by the collimator lens 9. The beam splitter 8 separates the forward and reflected beams by transmitting at least part of the converging beam 17 towards a detection system 18. The detection system captures the radiation and converts it into electrical output signals 19. A signal processor 20 converts these output signals to various other signals. One of the signals is an information signal 21, the value of which represents information read from the information layer 3. The information signal is processed by an information processing unit for error correction 86. Other signals from the signal processor 20 are the focus error signal and radial error signal 22. The focus error signal represents the axial difference in height between the spot 14 and the information layer 3. The radial error signal represents the distance in the plane of the information layer 3 between the spot 14 and the centre of a track in the information layer to be followed by the spot. The focus error signal and the radial error signal are fed into a servo circuit 23, which converts these signals to servo control signals 24 for controlling a focus actuator and a radial actuator respectively. The actuators are not shown in the Figure. The focus actuator controls the position of the objective system 11 in the focus direction 25, thereby controlling the actual position of the spot 14 such that it coincides substantially with the plane of the information layer 3. The radial actuator controls the position of the objective lens 11 in a radial direction 26, thereby controlling the radial position of the spot 14 such that it coincides substantially with the central line of track to be followed in the information layer 3. The tracks in the Figure run in a direction perpendicular to the plane of the Figure.

The scanning device of FIG. 1 has a relatively large tolerance range for tilt of the optical record carrier 1. It thereto determines the aberration caused by the tilted record carrier in the converging beam 13, and compensates the aberration by introducing a wavefront distortion in the collimated beam 10. The wavefront distortion is introduced by an aberration compensator 27 arranged in the collimated beam 10. A control circuit 28 controls the wavefront distortion via control signals 29. The value of the aberration to be compensated is determined by an aberration detector, which, in this embodiment, is a tilt detector 30. The tilt detector emits a radiation beam 31 towards the optical record carrier 1 and detects the angle of the beam reflected by the record carrier. The position of the spot of the reflected beam is a measure for the angle and, hence, for the tilt of the record carrier. The measured tilt is directly proportional to the coma introduced in the converging beam 13 by the passage of the beam through the tilted transparent layer 2 of the record carrier. Hence, the tilt signal 32, i.e. the output signal of the tilt detector 30, can be used directly as input for the control circuit 28, thereby controlling the amount of coma introduced by the aberration compensator 27.

The tilt detector 30 may be of any type. The tilt signal may also be derived from a combination of detector output signals 19. In that case the tilt detector forms part of the control circuit 28.

Figure 2:
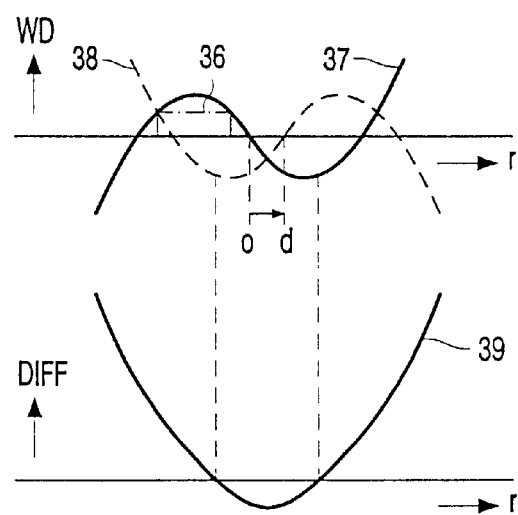
FIG. 2 shows two laterally displaced comatic wavefront distortions WD and the difference DIFF between them as a function of radial position r in the radiation beam.

The wavefront distortion introduced by the aberration compensator 27 will only compensate the aberration introduced by the tilted record carrier if the introduced aberration is correctly centred with respect to the objective system 11. The compensation is not correct anymore, if the introduced aberration is centred on the axis of collimated beam 10 and the objective system is displaced in a radial direction 26 because of radial tracking. The effect of this displacement is shown in FIG. 2, giving wavefronts in that radial cross-section of the radiation beam in which the objective system 11 has its radial displacement d. The displacement d is normalised on the radius of the entrance pupil of the objective system. Drawn curve 37 represents a comatic wavefront distortion WD, centred on the optical axis of the radiation beam 10 at r=0 and introduced by the aberration compensator 27. The dashed line 38 represents the comatic wavefront distortion to be compensated and caused by the tilted optical record carrier 1, and displaced from the optical axis by a distance d due to a displacement of the objective system 11. It is clear from the Figure that, when the displacement d is zero, the introduced aberration 37 will perfectly cancel the aberration 38, thereby providing a spot 14 on the information layer 3 of the record carrier 1 of high quality. When the displacement d is not equal to zero, the wavefronts 37 and 38 will not cancel each other, thus causing an imperfect compensation. The resulting wavefront error DIFF is the difference between curves 37 and 38, shown in FIG. 2 as line 39. For small displacements d, the difference 39 is proportional to the derivative of line 37 with respect to the co-ordinate in the direction of the displacement. The resulting wavefront error is one radial order lower than the wavefront distortion WD and, in this case, is astigmatism, the value of which is proportional to the displacement d and the amount of coma to be compensated. This astigmatism is a wavefront error proportional to the displacement and which in not compensated by an aberration compensator that introduces coma in the radiation beam. A more detailed analysis of the wavefront errors shows, that a decentred comatic wavefront not only introduces astigmatism but also a small amount of wavefront tilt and defocus. The wavefront tilt and defocus will be corrected automatically by the radial and focus servo respectively.

The measurement of the position of the objective system 11 in the radial direction 26, which may be used for the control of the aberration compensation, is performed by a position detector 33 as shown in FIG. 1. A position signal 34 generated by the position detector is used as input for the control circuit 28. The position of the objective system 11 may be measured using any known position measuring method. An optical method is preferred, because it does not affect the mechanical properties of the objective system. The position may also be derived from the detector output signals 19, as is known inter alia from U.S. Pat. No. 5,173,598 (PHN 13695). In that case the position detector forms a part of the signal processor 20.

Figure 3:
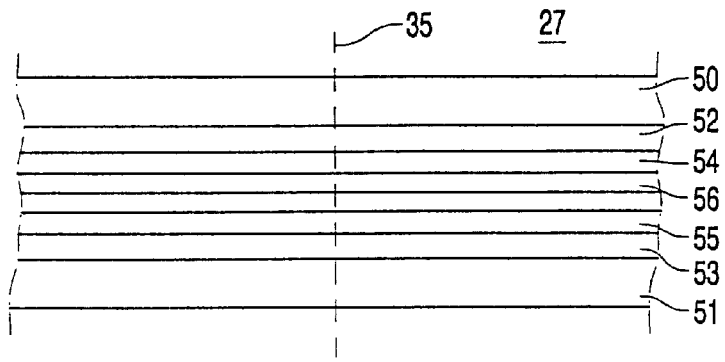
FIG. 3 shows a cross-section of an aberration compensator in the form of a liquid crystal cell.

FIG. 3 shows an embodiment of the aberration compensator, in the form of a liquid crystal cell. The cell comprises two plane parallel transparent plates 50 and 51, made of for instance glass. On the inner sides of the transparent plates transparent electrode layers 52 and 53 are arranged. The inner sides of the electrode layers are covered with alignment layers 54 and 55 respectively. A nematic liquid crystal material 56 is arranged between the two alignment layers. The liquid crystal material may be replaced by a ferro-electric medium, when higher switching speeds are required. The electrode layer comprises transparent conductors, made of for instance indium tin oxide. The refractive index of the liquid crystal material is controlled by the voltage difference between the electrode layers 52 and 53. Since the refractive index determines the optical path length through the liquid crystal layer 56, a temporal and/or spatial variation of the voltage difference can be used to change the wavefront of a radiation beam passing through the aberration compensator. Although the Figure shows a medium in the form of a flat liquid crystal layer, the medium may be curved. The thickness of the medium may vary as a function of position in the cross-section of the radiation beam, thereby reducing the requirements imposed on the control voltages.

Figure 4:
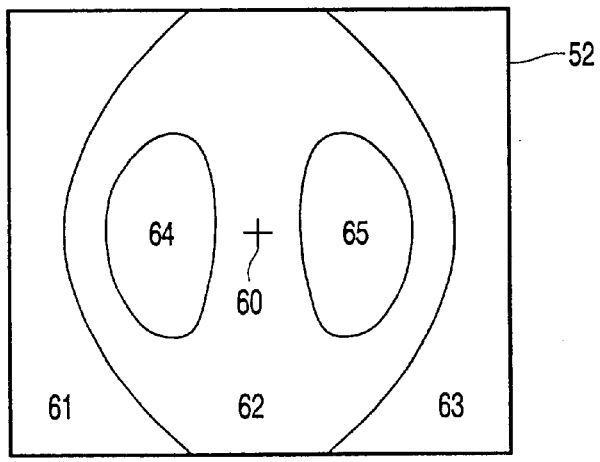
FIG. 4 shows an electrode configuration for introducing decentred coma.

FIG. 4 shows a plan view of the electrode structure in electrode layer 52. The electrode structure is adapted to introduce centred coma in the radiation beam. The electrode structure comprises various electrodes in the form of electrically conducting transparent regions separated by small non-conducting intermediate regions, not shown in the Figure. The electrode layer 52 comprises electrodes 61 to 65. The electrode layer 53 comprises one electrode covering the entire area of the cross-section of the radiation beam in the plane of the wavefront modifier. The intersection of the optical axis 35 of collimated beam 10 with the electrode layers is indicated by the cross 60. The electrode structure is adapted to introduce a comatic wave front aberration in the radiation beam passing through the liquid crystal cell in the form of the Zernike polynomial $(3r^3-2r) \cos \theta$, where r-$\theta$ are the polar co-ordinates in the cross-section of the radiation beam. The angle $\theta$ is zero along the horizontal direction in the Figure, from the cross 60 towards electrode 64. The width and position of electrode 64 is indicated by the dot and dash line 36 in FIG. 2. The width is chosen such that the electrode 64 covers those regions of the aberration compensator where the value of the Zernike polynomial $(3r^3-2r) \cos \theta$ is larger than a predetermined value 'a'. In practice, 'a' has a value between 0.1 and 0.35, and preferably has a value approximately equal to 0.25. The same applies to the other electrodes.

Figure 5:
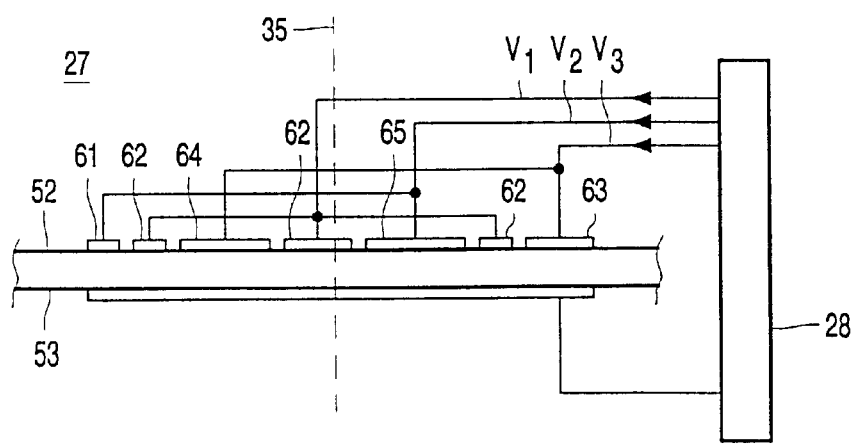
FIG. 5 shows electrical connections between the electrode configurations of FIG. 4 and a control circuit.

FIG. 5 shows a cross-section of the electrode layers 52 and 53, where the conductive regions are shown separated from one another. The electrode 61 and 65 are electrically connected, likewise electrodes 63 and 64 are pairwise electrically connected. These electrical connections may be made outside the electrode layers or in the electrode layers by means of small transparent conductive strips. Although the three regions 62 in FIG. 4 are connected in the layer, FIG. 5 also shows an external connection of the three regions for clarity's sake only. The cross-section of FIG. 5 is along line A—A shown in FIG. 4. The control circuit 28 provides the control signals 29, three of which are indicated in FIG. 5 by $V_1$ to $V_3$. Control signal $V_1$ is applied to electrode 62, $V_2$ to electrodes 61 and 65 and $V_3$ to electrodes 64 and 63.

Figure 6:
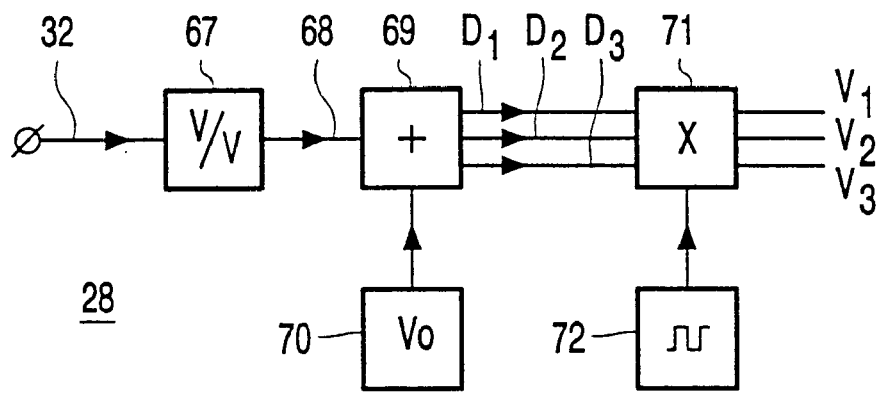
FIG. 6 shows a control circuit for the electrode configurations of FIG. 4.

The aberration compensator 27 may be controlled by applying various DC voltages to its electrodes. However, it is preferred to use AC voltages for the control in view of the stable operation of the liquid crystal. FIG. 6 shows an embodiment of the control circuit 28, providing the required AC control voltages. The tilt signal 32 is used as input for a voltage-to-voltage converter 67, which provides at its output a first control signal 68, having a value ΔV, dependent on the tilt signal 32. The first control signal 68 is connected to an adder 69. A voltage source 70 provides a reference voltage $V_0$ to the adder 69. The adder has three output signals $D_1$, $D_2$ and $D_3$, the values of which are $V_0$, $V_0+\Delta V$, $V_0-\Delta V$, respectively. The three output signals $D_1$–$D_3$ are used as input for a multiplier 71. A square-wave generator 72 provides a square wave signal, having a fixed amplitude and a predetermined frequency, preferably lying in the range between 1 and 10 kHz. This square wave signal is used as input for the multiplier 71. The multiplier provides three AC control signals, $V_1$, $V_2$ and $V_3$, as output signals. Each of the three output signals has a square-wave form and a zero average value. The peak-peak amplitude of signal $V_1$ is equal to $V_0$, that of signal $V_2$ is equal to $V_0+\Delta V$, that of signal $V_3$ is equal to $V_0-\Delta V$. The sign and magnitude of the control signals $V_1$–$V_3$ are such, that, when applied to the aberration compensator 27, the correct amount of coma is introduced in the collimated beam 10 to compensate partially the coma caused by the amount of tilt of the optical record carrier 1 as represented by the tilt signal 32. Thereto, the value of ΔV is proportional to the value of the tilt signal in a way as set out in the following paragraph. The control signal $V_1$ is connected to the electrode 62, $V_2$ to the electrode 61 and 65, and $V_3$ to the electrodes 63 and 64. The electrode in the electrode layer 53 is connected to ground. The value of the predetermined voltage $V_0$ depends on the properties of the aberration compensator 27, in particular the liquid crystal material, and is chosen such that the response of the compensator is proportional to ΔV.

The effectiveness of partial compensation for the reduction of the total wavefront error in the case of a displaced objective system will be explained by the following analysis. The wavefront φ of the radiation beam is factorized in Zernike polynomials according to the following formula:

$$\phi(x, y) = \frac{1}{\sqrt{2}} \sum_n A_{n0} Z_{n0}(x, y) + \sum_{n,l>0} A_{nl} Z_{nl}(x, y) \quad (1)$$

in which x,y are normalized co-ordinates in the pupil of the objective lens and centred on the optical axis of the objective system, $Z_{n1}$ is the Zernike polynomial of radial order n and angular order 1, and $A_{n1}$ the coefficient of the Zernike polynomial $Z_{n1}$. The Zernike polynomials up to the fourth radial order are:

$$Z_{00}(x,y)=1 \quad (2)$$

$$Z_{11}(x,y)=x \quad (3)$$

$$Z_{1-1}(x,y)=y \quad (4)$$

$$Z_{20}(x,y)=2(x^2+y^2)-1 \quad (5)$$

$$Z_{22}(x,y)=x^2-y^2 \quad (6)$$

$$Z_{2-2}(x,y)=2xy \quad (7)$$

$$Z_{31}(x,y)[3(x^2+y^2)-2]x \quad (8)$$

$$Z_{3-1}(x,y)=[3(x^2+y^2)-2]y \quad (9)$$

$$Z_{33}(x,y)=(x^2-3y^2)x \quad (10)$$

$$Z_{3-3}(x,y)=(3x^2-y^2)y \quad (11)$$

$$Z_{40}(x,y)=6(x^2+y^2)(x^2+y^2-1)+1 \quad (12)$$

$$Z_{42}(x,y)=(x^2-y^2)[4(x^2+y^2)-3] \quad (13)$$

$$Z_{4-2}(x,y)=2xy[4(x^2+y^2)-3] \quad (14)$$

$$Z_{44}(x,y)=2(x^2-y^2)^2-(x^2+y^2)^2 \quad (15)$$

$$Z_{4-4}(x,y)=4xy(x^2-y^2) \quad (16)$$

When an aberration compensator, introducing an aberration $Z_{n1}$, is displaced by an amount of d with respect to the objective system, the wavefront entering the objective system is not $Z_{n1}(x,y)$, but the wavefront $Z_{n1}(x+d,y)$. This displaced wavefront can be factorized in Zernike polynomials $Z_{n1}(x,y)$. The results for astigmatism, coma and spherical aberration are, respectively, $$Z_{22}(x+d,y)=Z_{22}(x,y)+2dZ_{11}(x,y)+d^2Z_{00}(x,y) \quad (17)$$

$$Z_{31}(x+d,y)=Z_{31}(x,y)+3dZ_{22}(x,y)+3dZ_{20}(x,y)+3dZ_{00}(x,y)+9d^2Z_{11}(x,y)+3d^3Z_{00}(x,y) \quad (18)$$

$$Z_{40}(x+d,y)=Z_{40}(x,y)+8dZ_{31}(x,y)+4dZ_{11}(x,y)+12d^2Z_{22}(x,y)+12d^2Z_{20}(x,y)+12d^2Z_{00}(x,y)+24d^3Z_{11}(x,y)+6d^4Z_{00}(x,y) \quad (19)$$

When the aberration compensator introduces astigmatism, coma or spherical aberration, a displacement of the objective system will generate the factors of the right hand sides of the equations, the amount of which depends on the displacement d. The constant polynomial $Z_{00}$ is irrelevant. The wavefront tilt $Z_{11}$ and the defocus $Z_{20}$ need not be considered for scanning devices using servo systems to control the focus and radial displacement of the spot of the radiation beam, because the servo systems will automatically remove any wavefront tilt and defocus. Hence, the effect of displacement on an aberration compensator that introduces astigmatism $Z_{22}$ is that no additional aberrations are in generated, for an aberration compensator that introduces coma $Z_{31}$ an amount of astigmatism is generated linear in the displacement d, and for an aberration compensator that introduces spherical aberration $Z_{40}$ an amount of coma and astigmatism is introduced, the amount of which is linear and quadratic respectively in the displacement d.

The compensation of wavefront errors is expressed in terms of the root-mean-square (RMS) aberration of the wavefront φ which is given by $$RMS^2 = \sum_{n,l} \frac{1}{2(n+1)} |A_{nl}|^2 \quad (20)$$

When an aberration compensator introduces an amount $A_{31}$ coma in the radiation beam, the wavefront error of the radiation beam is $$RMS^2 = \frac{1}{8}|A_{31}|^2 \quad (21)$$

The displacement changes the wavefront $A_{31}Z_{31}(x+d,y)$ to the wavefront $A_{31}Z_{31}(x,y)$ to which, amongst others, an amount of astigmatism $A_{22}Z_{22}(x,y)$ is added. The amount of astigmatism is given by $A_{22}=3dA_{31}$. This additional aberration increases the wavefront error of the radiation beam by $$\Delta RMS^2 = \frac{1}{6}|A_{22}|^2 = \frac{3d^2}{2}|A_{31}|^2 \quad (22)$$

The ratio between the increase of the wavefront error due to displacement and the wavefront error introduced by the aberration compensator is given by $$\frac{\Delta RMS^2}{RMS^2} = 12d^2 \qquad (23)$$

Suppose that tilt of the record carrier introduces an amount of coma in the radiation beam near the focal spot having a value $RMS^2=(A_{31})^2/8=c^2\theta^2$, in which c is a constant and θ is the tilt of the record carrier. The latter equivalence is based on the fact that the coma introduced in the radiation beam is proportional to the tilt of the record carrier. In the prior art scanning devices an aberration compensator introduces an amount of coma proportional to cθ, given a wavefront error with $RMS^2=c^2\theta^2$, completely compensating the coma caused by the tilt of the record carrier. In a scanning device according to the invention, the aberration compensator introduces an amount of coma proportional to μcθ, where $0 \leq \mu \leq 1$. The uncompensated coma is proportional to $(1-\mu)c\theta$, with $RMS^2=(1-\mu)^2c^2\theta^2$. Displacement of the objective system generates an astigmatism with $\Delta RMS^2=12d^2\mu^2c^2\theta^2$, as explained in the previous paragraph. The total wavefront error in the radiation beam after the objective lens R(tot) is equal to $$RMS^2(tot)=RMS^2+\Delta RMS^2=[(1-\mu)^2+12d^2\mu^2]c^2\theta^2 \qquad (24)$$

Figure 7:
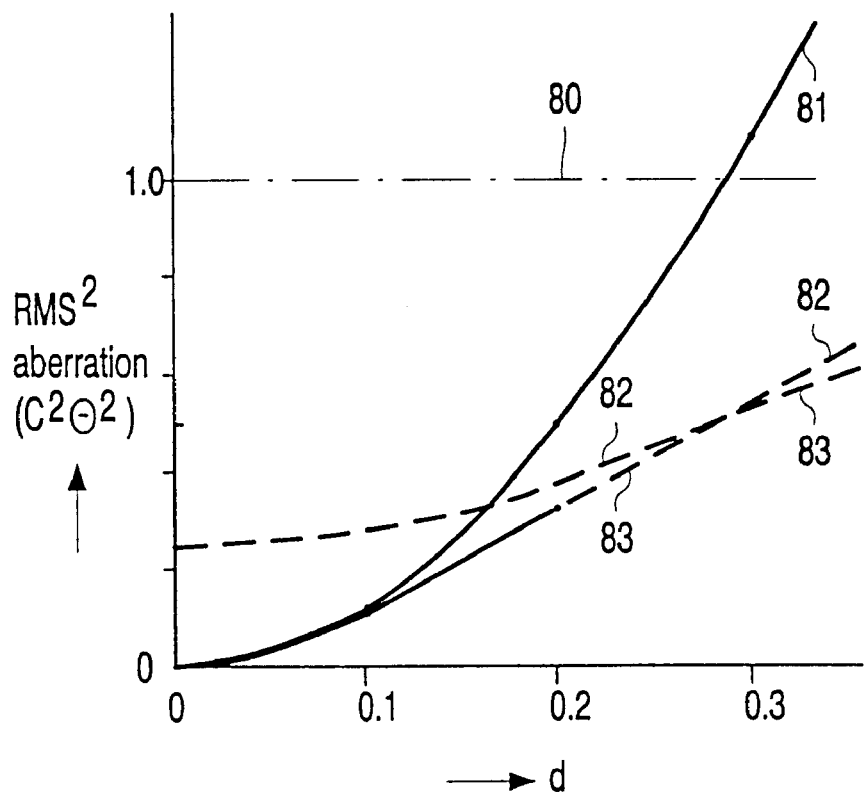
FIG. 7 shows the remaining wavefront error as a function of the displacement of the objective system.

FIG. 7 shows the wavefront error as a function of the displacement for various cases. The vertical axis shows the RMS wavefront aberration in terms of $c^2\theta^2$. If the aberration compensator does not introduce an aberration and the coma caused by tilt of the record carrier is not compensated, i.e. μ=zero, the wavefront error in the radiation beam near the focal spot is independent of the displacement d of the objective system and is indicated in FIG. 7 by the dash-dot line 80.

If the aberration compensator completely compensates the coma, i.e. μ=−1, the total wavefront error is given by $RMS^2(tot)=(1+12d^2)c^2\theta^2$, and indicated by the drawn line 81 in FIG. 7. The Figure shows that complete compensation of coma at a displacement d larger than 0.3 increases the wavefront error instead of decreasing it.

In an embodiment of the optical head according to the invention, the compensation is only partial and the degree of compensation is constant, independent of the displacement of the objective system. In terms of the above formalism, this is μ<1 and independent of d. As an example, the dashed line 82 in FIG. 7 shows the aberration for the case where μ=0.5, giving a wavefront error $RMS^2=0.25+3d^2$. Compared to the case without compensation, the wavefront error over the range of displacement has been reduced considerably. The reduction has been obtained at the price of a small increase of the wavefront error when the objective system is centred (d=0). Compared with a case of complete compensation, the wavefront error has been reduced for displacement larger than 0.15. The choice of the value of μ is a matter of design, depending on the tolerated wavefront error for the centred objective system and the tolerated wavefront error at the end of the displacement range.

Figure 8A:
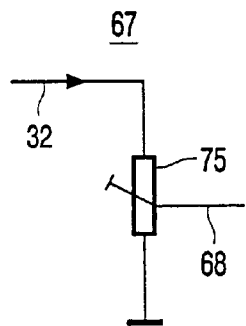
FIGS. 8A and B show two embodiments of part of the control circuit.

FIG. 8A shows an implementation of the voltage-to-voltage converter 67 of the control circuit 28. The tilt signal 32 is connected to a potentiometer 75. The first control signal 68 is taken from the central tap of the potentiometer 75. The desired value of μ is chosen by setting the tap of the potentiometer such that the desired amount of compensation is obtained.

In another embodiment of the optical head according to the invention the value of $RMS^2(tot)$ is minimised with respect to μ for each value of the displacement d. The minimum RMS is found for $$\mu = \frac{1}{1+12d^2} \qquad (25)$$

For d=0, i.e. no displacement, the value of μ is equal to 1 and the coma will be completely compensated. When the absolute value of d increases, the value of μ will decrease. The total wavefront error is now $$RMS^2(tot) = \frac{12d^2}{(1+12d^2)}c^2\theta^2 \qquad (26)$$

This equation is represented by the dashed line 83 in FIG. 7. Line 83 lies below line 81 for any value of d, showing that the partial compensation with wavefront error minimisation provides a smaller wavefront error than the complete compensation.

Figure 8B:
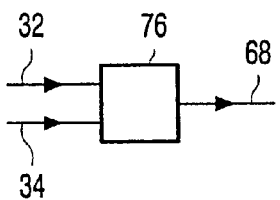

FIG. 8B shows an embodiment of the voltage-to-voltage converter of the control circuit 28. A mathematical circuit 76 has as input the tilt signal 32 and the position signal 34 indicating the position of the objective system 11. The circuit determines the value of μ in dependence on the value of the position signal 34 according to equation (25) and multiplies the result with the tilt signal 32. The determination of μ may be made by actually calculating the values or by choosing a value in a look-up table. The calculation may be simplified by approximating the equation for μ by a straight line.

The aberration compensator 27 in the above described embodiments compensates coma caused by tilt of the record carrier 1, taking into account the position of the objective system 11. The partial compensation can also be used for compensators that introduce aberrations other than coma, for instance spherical aberration, caused for instance by variations in the thickness of the transparent layer 2 of the record carrier 1. When an optical beam in which centred spherical aberration has been introduced, passes through a displaced objective system, the beam after passage through the objective system will suffer from coma which is linear in the displacement and astigmatism which is quadratic in the displacement of the objective system. The compensation of the spherical aberration can be corrected for the displacement of the objective system in a way similar to the correction in the above described embodiments of the aberration compensator.

Figure 9:
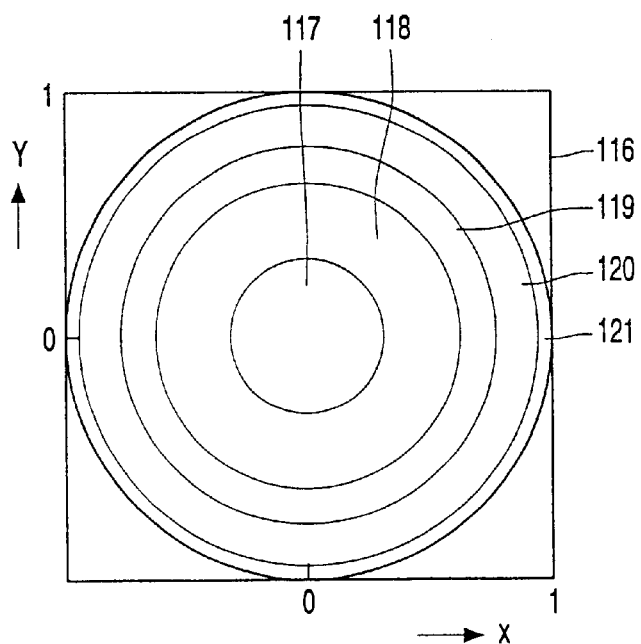
FIG. 9 shows an electrode configuration for introducing spherical aberration.

FIG. 9 shows a electrode configuration 116 for generating spherical aberration. The Zernike representation of the aberration is $Z_{40}=6(x^2+y^2)^{(x^2+y^2-1)}+1$. The borders between the electrodes and the voltages applied to them can be derived as follows. The points in the configuration with $Z_{40}(x,y)>a$, i.e. the central area 117 and the ring 121, are set at a voltage $V_0\Delta V$. The points in the configuration complying with $-a<Z_{40}(x,y)<a$, i.e. the rings 118 and 120, are set at a voltage $V_0$. The points in the pupil with $Z_{40}(x,y)<-a$, i.e. the ring 119, are set at a voltage $V_0+\Delta V$. The parameter 'a' is preferably in the range from 0.20 to 0.70. The electrode configuration shown in FIG. 9 is for a=√3/4=0.433. This value of a gives equal surface areas for the electrodes to which a voltage $V_0-\Delta V$ is applied and those to which $V_0+\Delta V$ is applied. The electrode configuration for generating spherical aberration may be simplified by forming three concentric rings and applying different voltages to them.

The aberration compensator is controlled by the position signal 34 representing the position of the objective system and a signal representing the amount spherical aberration in the radiation beam returning from the record carrier. A sensor for measuring the spherical aberration in the radiation beam is described in the European Application having filing number 98204477.8 (PHN 17.266).

The expressions for partial compensation of spherical aberration can be derived in a way similar to the expressions for the partial compensation of coma in the above paragraphs. The RMS wavefront error of the undesired spherical aberration in the radiation beam is set equal to S; the amount of spherical aberration is then proportional to S. When the aberration compensator introduces an amount of $\mu^2 S^2$ RMS$^2$ spherical aberration in the radiation beam for the compensation of the undesired spherical aberration, where $\mu \leq 1$, then the total wavefront error RMS$^2$(tot) in the presence of an amount of displacement $\epsilon$ of the objective system is equal to $$RMS^2(tot) = [(1-\mu)^2 + \mu^2(40d^2 + 120d^4)]S^2 \qquad (27)$$

The factor in d$^2$ is caused by coma and the factor in d$^4$ by astigmatism. Minimisation of the wavefront error with respect to $\mu$ yields $$\mu = \frac{1}{1 + 40d^2 + 120d^4} \qquad (28)$$

$$RMS^2(tot) = \frac{40d^2 + 120d^4}{1 + 40d^2 + 120d^4} S^2 \qquad (29)$$

If the displacement d increases from 0 to 0.22, the total wavefront error increases from 0 to 69% of the wavefront error of the uncompensated spherical aberration. Without partial compensation the increase would have been from 0 to 222% of the wavefront error of the uncompensated spherical aberration. It will be clear that the degree of spherical aberration compensation can be made constant, i.e. independent of the displacement d, or dependent on the displacement, similar to the partial compensation of coma.

The electrode configurations for generating spherical aberration, coma and/or astigmatism may be combined into a single electrode configuration by a suitable division of the electrode layer into separate electrodes and a corresponding adaptation of the control circuit. The aberration compensator may comprise one electrode layer for introducing two aberrations, e.g. coma and astigmatism, and one electrode layer for introducing another aberration, e.g. spherical aberration. One or more of the aberrations can be controlled to obtain a partial compensation.

What is claimed is:

1. An optical system for scanning an optical record carrier having an information layer, said optical system comprising:
   a radiation source for generating a radiation beam;
   an objective system for converging the radiation beam to a focus on the information layer;
   an actuator for displacing the objective system over a range of displacements in a direction transverse to an optical axis of the objective system;
   an aberration detector for detecting an amount of an optical aberration in the radiation beam;
   an aberration compensator arranged in the optical path between the radiation source and the objective system; and
   a control circuit connected to an output of the aberration detector for controlling the aberration compensator, wherein the control circuit is adapted to have the aberration compensator compensate the optical aberration to a degree of compensation that is less than a total amount of the optical aberration detected by the aberration detector, for substantially all displacements in the range of displacements.

2. The optical system of claim 1, wherein the degree of compensation depends on a maximum value of the displacement of the objective system, the degree being independent of an instantaneous displacement of the objective system.

3. The optical system of claim 1, further comprising a position detector for determining a position of the objective system in the direction transverse to the optical axis, the control circuit being connected to an output of the position detector, and the degree of compensation depending on an instantaneous displacement of the objective system.

4. The optical system of claim 1, wherein the optical aberration is coma.

5. The optical system of claim 1, wherein the optical aberration is spherical aberration.

6. The optical system of claim 1, further comprising an information processing unit for performing error correction on an information signal read from the information layer, said information signal having had its optical aberration compensated by the aberration compensator to the degree of compensation.

7. The optical system of claim 1, wherein the degree of compensation removes 90% or less of the RMS wavefront error of the optical aberration to be compensated.

8. The optical system of claim 1, wherein d denotes an instantaneous displacement of the objective system, wherein the optical aberration in the radiation beam has a RMS$^2$ value of S$^2$, wherein the aberration compensator compensates by introducing added aberration into the radiation beam, wherein the added aberration has a RMS$^2$ value of $\mu^2 S^2$ such that $0 < \mu < 1$, and wherein the wavefront of the radiation beam after introduction of the added aberration has a total RMS$^2$ error that is a function of $\mu$ and d.

9. The optical system of claim 8, wherein $\mu$ is independent of d.

10. The optical system of claim 8, wherein $\mu$ is a function of d such that the total RMS$^2$ error is minimized at each d.

11. An optical aberration correcting method, comprising:
    providing an optical record carrier having an information layer;
    generating a radiation beam;
    converging the radiation beam to a focus on the information layer, said converging being accomplished by an objective system;
    detecting an amount of an optical aberration in the radiation beam, said detecting being accomplished by an aberration detector; and
    compensating the optical aberration to a degree of compensation that is less than a total amount of the optical aberration detected by the aberration detector, for substantially all displacements in a range of displacements of the objective system in a direction transverse to an optical axis of the objective system.

12. The method of claim 11, wherein the degree of compensation depends on a maximum value of the displacement of the objective system, the degree being independent of an instantaneous displacement of the objective system.

13. The method of claim 11, further comprising determining a displacement of the objective system in the direction transverse to the optical axis.

14. The method of claim 11, wherein the optical aberration is coma.

15. The method of claim 11, wherein the optical aberration is spherical aberration.

16. The method of claim 11, further comprising performing error correction on an information signal read from the information layer, said information signal being in the radiation beam after said compensating.

17. The method of claim 11, wherein compensating the optical aberration removes 90% or less of the RMS wavefront error of the optical aberration to be compensated.

18. The method of claim 11, wherein d denotes an instantaneous displacement of the objective system, wherein the optical aberration in the radiation beam has a $RMS^2$ value of $S^2$, said method further comprising determining a number $\mu$ such that $0<\mu<1$, wherein said compensating includes introducing added aberration into the radiation beam such that the added aberration has a $RMS^2$ value of $\mu^2 S^2$, and wherein the wavefront of the radiation beam after said introducing has a total $RMS^2$ error that is a function of $\mu$ and d.

19. The method of claim 18, wherein $\mu$ is independent of d.

* * * * *